(12) United States Patent
McDonald

(10) Patent No.: US 8,925,781 B2
(45) Date of Patent: Jan. 6, 2015

(54) UTILITY MARKER SETTER

(76) Inventor: James C McDonald, Wilmington, NC (US)

( * ) Notice: Subject to any disclaimer, the term of this patent is extended or adjusted under 35 U.S.C. 154(b) by 464 days.

(21) Appl. No.: 13/495,110

(22) Filed: Jun. 13, 2012

(65) Prior Publication Data

US 2013/0334276 A1    Dec. 19, 2013

(51) Int. Cl.
*B25C 5/11* (2006.01)
(52) U.S. Cl.
USPC .............................. 227/120; 173/90; 116/211
(58) Field of Classification Search
CPC .................................. B65D 83/14; B25C 1/02
USPC ....................................... 227/120; 173/90, 91
See application file for complete search history.

(56) References Cited

U.S. PATENT DOCUMENTS 1,106,241 A * 8/1914 Richardson .................... 227/147
4,706,864 A * 11/1987 Jacobsen et al. .............. 227/109
5,025,969 A * 6/1991 Koester et al. ................. 227/120
6,435,129 B1 * 8/2002 McDonald et al. ........... 116/211
6,450,388 B1 * 9/2002 Denton .......................... 227/120
6,802,278 B2 * 10/2004 McDonald et al. ........... 116/211
6,926,186 B2 * 8/2005 Wells ............................. 227/129

* cited by examiner

*Primary Examiner* — Andrew M Tecco
*Assistant Examiner* — Nathaniel Chukwurah
(74) *Attorney, Agent, or Firm* — MacCord Mason PLLC

(57) ABSTRACT

A marker setter is described that includes a magazine holding a plurality of stacked planar markers, each marker having a flag section and a post section with a distal tip; a marker extractor adapted to extract a marker from the stacked plurality of markers and convey the marker along a pathway to insert the tip of the marker into the ground, the marker extractor having a post inserter with a distal end; and a tip deflector adapted to bend the marker distal tip around the post setter distal end prior to insertion of the tip into the ground. The tip deflector includes a deflector plate pivotal between an initial position in the pathway of the marker tip and post inserter, and a forward position beneath the pathway, the deflector being moved to the forward position by the post inserter while bending the marker tip around the post inserter distal end.

20 Claims, 4 Drawing Sheets

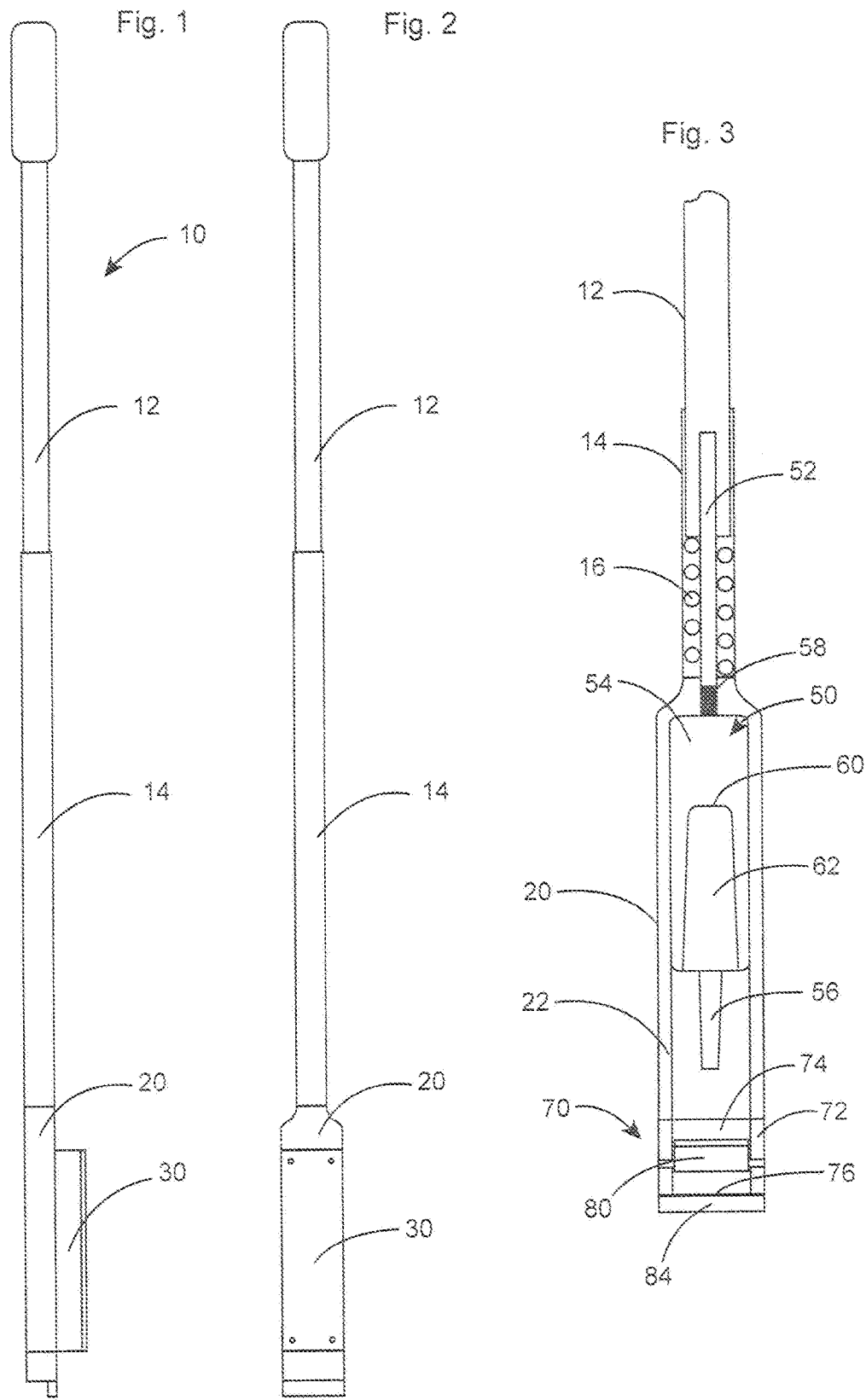

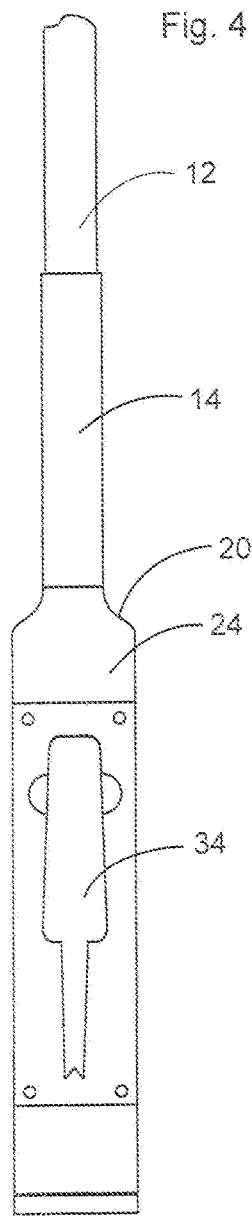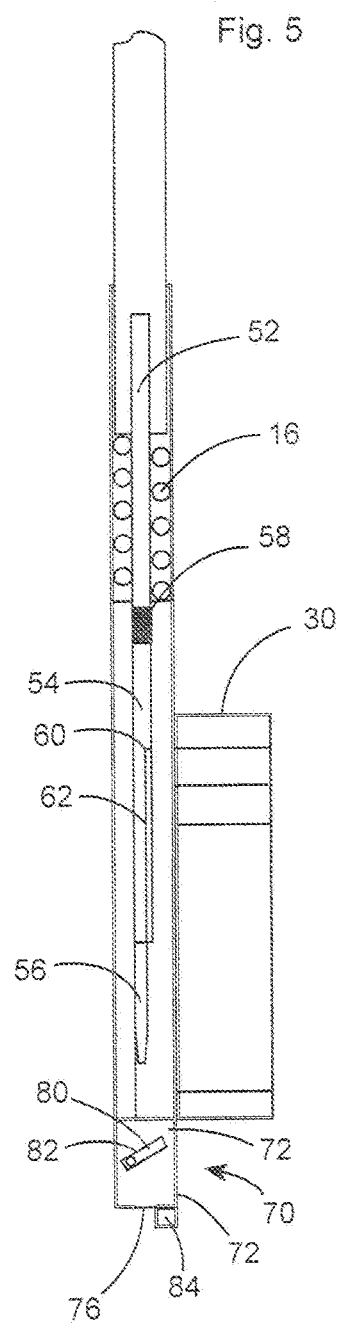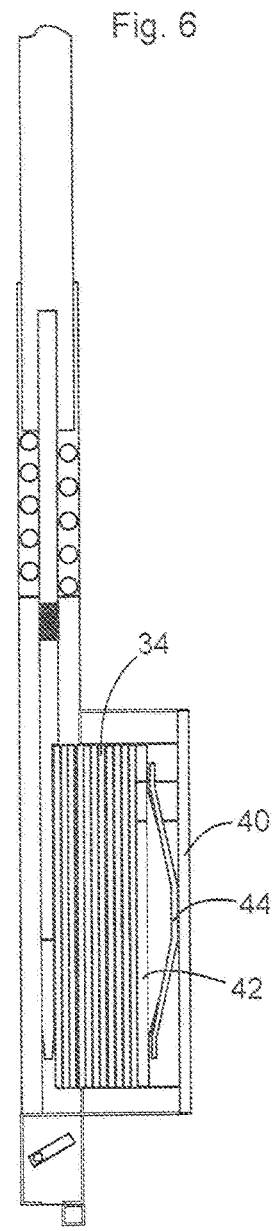

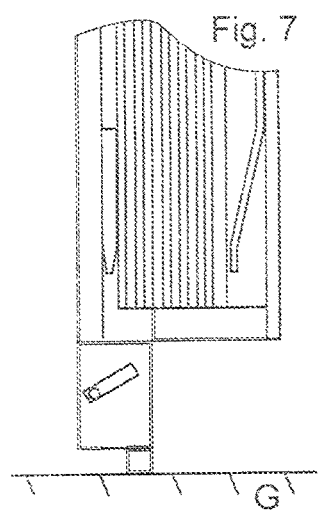
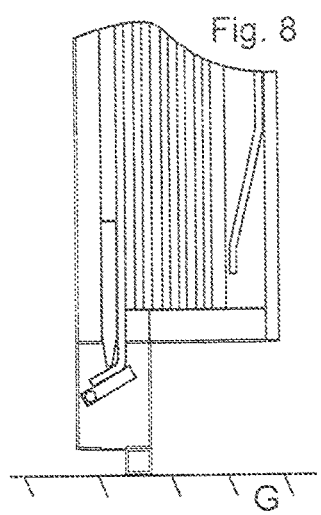
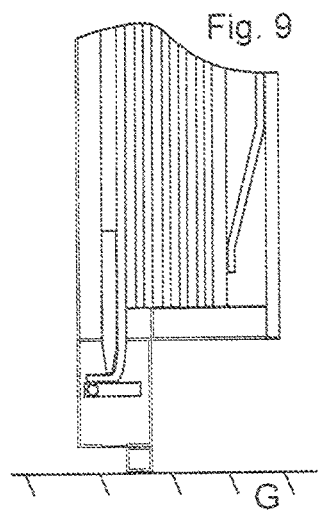
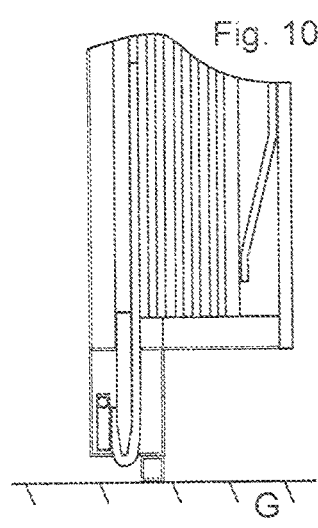
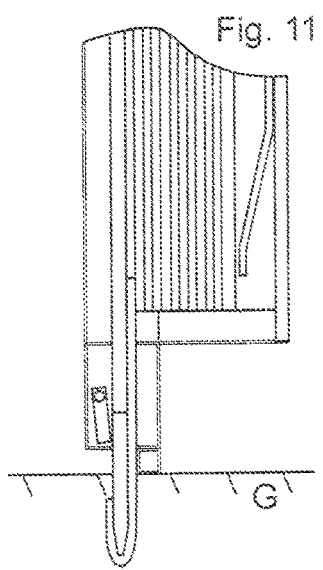

UTILITY MARKER SETTER

BACKGROUND OF THE INVENTION (1) Field of the Invention

The present invention relates generally to a device for setting utility markers into the ground, and in particular to a device that can be used to set utility markers while bending the tip of the marker.

(2) Description of the Prior Art

The location of underground utility supply lines, the term including gas, water, sewer, electrical power, telephone, cables, and other lines or conduits used to provide services to a residence or other building, must be identified prior to excavation in the area where such lines are located. Most municipalities and utility companies provide a free or low cost service to locate these utility lines. Once the lines are located, it is the common practice to mark the location of the lines, so that they will not be accidentally damaged.

Utility lines are commonly marked in two ways. First, markers, also known as flags, are inserted into the ground above the line, with each marker having an above ground signal section, and a below ground post or anchoring section. While most markers are comprised of a flexible wire with a small plastic flag at the top end, other markers have been proposed in the prior art.

The signal section of the marker is of a particular color to designate the type of utility line being marked. For example, orange is used to designate telephone lines, yellow is for gas, blue is for water, red is for electrical lines, etc.

When marking a utility line, the worker bends over to insert each marker into the ground. Since numerous markers are frequently required to mark utility lines, this effort can become laborious, as well as time consuming. The need for a device that will facilitate insertion of utility markers without the need to bend over is recognized in U.S. Pat. Nos. 6,435,129 and 6,802,278 to McDonald et al. One of the inventors of the inventions described in those patents is the present inventor.

Generally, the prior art utility marker insertion device disclosed in the McDonald et al. patents is comprised of an elongated handle that has an upper end and a lower end, a marker magazine adjacent the lower end of the handle to hold a plurality of markers, and a marker extractor at the lower end of the handle that is movable along a marker extractor pathway between a raised position and a lowered or extended position in which the lower end of the marker extractor extends beyond the lower end of the handle, whereby a leading marker from the magazine is removed from the magazine and inserted into the ground when the marker engagement member is moved to its extended position, with the lower end of the handle being against the around surface.

The prior art marker is comprised of an upper signal section having at least one planar surface, a longitudinal axis, opposed sides, an upper end and a lower end; a lower post section having a lower end and an upper end attached to the lower end of the signal section; and an extractor receiver extending outwardly and upwardly from the distal end of the post section. In the preferred embodiment, the extractor receiver is formed by folding the lower end of the marker post upwardly and packaging the markers in a face-to-rear relationship with the tips folded.

The marker magazine is comprised of a housing that is releasably attachable adjacent the lower end of the handle, and is adapted to hold a plurality of markers, the marker adjacent the marker extractor pathway being designated as the leading marker. The housing includes a front wall with a discharge opening, and may include a resilient member to urge markers within the housing toward the discharge opening.

The device handle preferably is comprised of a tubular lower handle section with upper and lower ends, and a plunger with upper and lower ends slideable within the lower handle section. The plunger has a raised position in which the upper end of the plunger is above the lower handle section, and a lowered position in which the plunger is further inserted into the lower section. A spring or other resilient member is positioned with the handle to urge the plunger to the raised position. A foot or striker plate is attached to the bottom of the handle, to contact the ground when a marker is to be inserted into the ground. The upper end of the plunger can include a handgrip for ease of use.

With this handle configuration, the marker extractor is preferably attached to the plunger adjacent the plunger lower end, while the marker magazine is attached to the outer surface of the lower tubular section adjacent the lower end of the tubular section. A vertical extractor slot within the tubular section wall extends from the lower end of the tubular section, with the marker extractor being movable within the extractor slot. The magazine is removably mounted on the exterior of the tubular housing, with its discharge opening being aligned with the extractor slot.

The marker extractor includes a lower end, which is preferably beveled, that is above the lower portion of the pathway when the extractor is in the raised position. The magazine is positioned so that the lead marker extends into the lower portion of the pathway and beneath the lower end of the raised extractor. When the extractor is extended by pushing downward on the plunger to which it is attached, the lower end of the extractor engages the folded lower tip of the marker post, pulling the lead marker from the magazine. If the lower end of the handle is on the ground, full movement of the extractor to its extended position, extends the lower end of the extractor into the ground, thereby inserting the lower end of the marker into the ground.

While this prior art flag setter is a significant improvement over earlier means for setting utility flags, there is still a need for further improvement, particularly in the way the markers are packaged prior to extraction and the way that the markers are extracted. In particular, there is a need to provide markers that do not have folded ends prior to extraction, and a device for folding the marker lower ends as the markers are extracted from the setter.

SUMMARY OF THE INVENTION

The present invention addresses this need by providing a utility marker setter useful in setting utility markers that do not have folded tips when loaded in the marker magazine, and which bends the tips of the markers as the markers are discharged from the marker setter into the ground. As will be described in detail, the improved marker setter extracts individual planar markers from a magazine and bends the tip of the marker by trapping the tip of the marker between a pivotal deflector plate and the distal end of the marker extractor as the marker is discharged from the setter into the around.

Generally, the utility marker setter is comprised of an elongated handle that has telescoping inner and outer sections, an extractor housing having a longitudinal slot mounted at the lower end of the handle outer section, a marker extractor attached to the lower end of the handle inner section and extending into the extractor housing, a marker magazine having a marker chamber in communication with the extractor housing slot, and a marker tip deflector mounted at the lower end of the extractor housing slot.

The handle inner section has a lower end extending into the upper end of the handle outer section and an upper end projecting above the handle outer section. The handle inner section is telescoping within the outer section between a raised position and a lowered position, with a spring within the handle urging the inner section to the raised position. A handgrip is attached to the upper end of the handle inner section.

The marker extractor housing is attached to the lower end of the handle outer section and includes a longitudinal slot having an upper opening in communication with the interior of the handle, and a lower discharge end. A side wall of the extractor housing is adapted for attachment of the marker magazine and includes a marker insertion opening to receive markers from the marker magazine.

The marker extractor includes a drive rod with upper and lower ends that extends downwardly from the handle inner section, a marker receiver plate having an upper end attached to the lower end of the drive rod, and a post inserter attached to the lower end of the receiver plate. Preferably, the drive rod, marker receiver and post inserter are aligned along a common longitudinal axis. The marker receiver plate includes a recess sized to receive the flag end of a single marker. The post inserter has a width approximately equal to the width of the marker post, a length less than the length of the marker post, and a tapered distal end. Preferably, a part of the marker extractor, e.g., at least a part of the drive rod, is non-conductive, so that electricity will not be transmitted through the inner section of the handle in the event the post inserter contacts an electric line during placement of a marker.

The marker magazine includes a housing with a marker storage cavity sized to receive a stack of planar markers, i.e., markers in which all parts of the marker lie in a common plane. The cross-sectional dimensions of the cavity preferably correspond to the dimensions of the marker to ensure that the markers maintain alignment. The bottom of the magazine cavity is aligned with and open to the extractor housing opening. A marker compressor, e.g., a spring and a pressure plate, presses against the top of the marker stack to urge the markers into the extractor housing and against the extractor plate.

The marker tip deflector is mounted at the lower discharge end of the extractor housing and includes a longitudinal slot aligned for insertion through the slot of the post inserter and a marker. A pivotal deflector plate is positioned in the pathway of the distal ends of the marker post and the post inserter with a rear contact face that is contacted by the distal ends of the marker and post inserter. The deflector plate is pivotal between a rearwardly inclined position and a forward position.

A spring urges the deflector plate to the rearward position. When in the forward position, the contact face of the deflector plate extends forward so that the deflector plate is beneath the pathway of the marker and post inserter so that the marker tip and post setter can move across the deflector plate and through the deflector discharge opening for insertion into the ground. As the marker and post setter moves across the deflector plate, the bent end of the marker is held around the post setter tip. The deflector plate also includes a foot or contact plate for placement of the marker setter against the ground when the handle inner section is pushed downward.

In operation, a stack of planar markers are inserted into the marker magazine, with the cover and compressor being placed on the magazine to urge the markers into the extractor housing with the leading marker being in the marker recess of the extractor marker receiver plate. To insert a marker at the desired location, the operator places the foot of the marker setter against the ground and pushes downward on the inner handle section, which forces the marker extractor and one marker downward.

When moved downward, the lower end of the marker post initially contacts the slanted inner face of the deflector plate causing the end of the post to bend into the path of the post inserter. Due to the flexibility of the marker post, the deflector does not pivot under the force of the marker post.

Further downward movement brings the distal end of the post setter into contact with the bent part of the marker post, clamping the post between the distal end of the post setter and the contact face of the deflector plate. Further movement causes the deflector plate to pivot to its forward position under the force of the post setter, with the bent end of the marker post being held between the post setter and deflector plate.

Further downward movement extends the post setter and marker post with the bent end out of the discharge opening and into the ground. The inner handle section is then returned to its raised position withdrawing the post setter from the ground and into the extractor housing. Due to the anchoring by the bent end, however, the marker post remains embedded in the around. Preferably, the distal end of the marker post is forked for greater anchoring ability.

The exact configuration of the utility marker dispensed from the marker magazine will depend upon the corresponding configuration of the magazine housing and the discharge opening, as well as the desired end use and preferences of the designer. For example, the marker may be comprised of an upper signal section having at least one planar surface, a longitudinal axis, opposed sides, and an upper end and a lower end; and a lower post section having a lower end and an upper end attached to the lower end of the signal section.

An integral marker of this configuration may be cut from a single sheet of flexible material, e.g., plastic or paper. No folding of the lower end of the lower post section is required as in the above-described prior art devices. The signal section will be substantially wider than the post section, e.g., the signal section is preferably at least twice the width of the post section. Thus, in embodiments where the signal and post sections are integrally formed with a common central axis, a shoulder may be formed where the lower end of the signal section joins the upper end of the post section.

BRIEF DESCRIPTION OF THE DRAWINGS

FIG. 1 is a side view of the marker setter.

FIG. 2 is a front view of the marker setter.

FIG. 3 is a sectional front view of the marker setter with the marker magazine removed and a part of the handle cut away.

FIG. 4 is a sectional front view of the marker setter with the marker magazine cover removed and a part of the handle cut away.

FIG. 5 is a sectional side view of the marker setter with the marker magazine empty and the cover removed.

FIG. 6 is a sectional side view of the marker setter with the marker magazine filled with a stack of markers.

FIG. 7 is a sectional side view of the lower part of the marker setter with the handle the fully raised position.

FIG. 8 is a sectional side view of the lower part of the marker setter with the handle in a first lowered position with the tip of the marker deflected by the deflector plate.

FIG. 9 is a sectional side view of the lower part of the marker setter with the handle in a second lowered position with the tip of post setter clamping the deflected marker tip against the deflector plate.

FIG. 10 is a sectional side view of the lower part of the marker setter with the handle in a third lowered position with the post setter deflecting the deflector plate to the forward position with the tip of the marker bent around the post setter tip.

FIG. 11 is a sectional side view of the lower part of the marker setter with the handle in the fully lowered position with the post setter and marker with its tip bent around the tip of the post setter inserted into the ground.

DETAILED DESCRIPTION OF THE INVENTION

Figure 12:
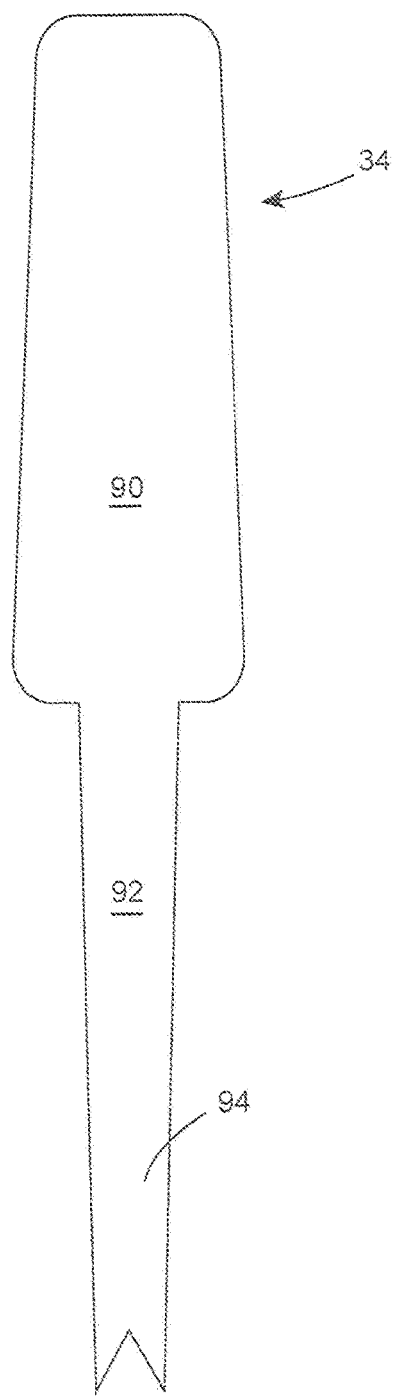
FIG. 12 is a front view of a preferred marker.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

A preferred embodiment of the marker setter, generally 10, is comprised of upper handle section 12 that is movable between raised and lowered positions within tubular lower handle section 14. Spring 16 is positioned between handle section 12 and lower handle section 14 to urge handle section 12 toward its raised position.

Extractor housing 20 is mounted at the lower end of handle section 14, and includes a generally rectangular slot 22 that is axially aligned with the longitudinal axis of lower handle section 14. Housing 20 includes a top wall 24 with a marker receiving opening 26. Wall 24 is adapted for releasable attachment of marker magazine 30, e.g., by releasable connectors.

Marker magazine 30 includes an inner cavity 32 to receive a stack of markers 34, cavity 32 being aligned with, and of the same cross-section as, opening 26 when magazine 30 is attached to housing 20. Magazine 30 also includes a removable cover 40 and a spring-loaded marker compressor, shown as plate 42 and spring 44, to push markers 34 into housing 20 and press the lead marker against marker extractor 50.

Marker extractor 50 is comprised of drive rod 52 that has an upper end attached to upper handle section 12, and a lower end; a marker receiver plate 54 attached to the lower end of rod 52, and a post setter 56 extending downwardly from plate 54. Drive rod 52 preferably includes a non-conductive section 58 to prevent electricity from being conducted to handle section 12 in the event that marker setter 10 contacts a live electric wire during use.

Rod 52, plate 54 and post setter 56 are aligned along a common longitudinal axis, and plate 54 has an upper face toward magazine 30 that includes a shoulder 60 positionable adjacent the upper end of the lead marker. Shoulder 60 may be part of an open-end recess 62 having the dimension of the flag portion of marker 34 and the thickness of a single marker 34.

Deflector, generally 70, is mounted on the lower end of extractor housing 20, and includes a housing 72 with an inner chamber 74, which has a discharge slot 76. Spring loaded, pivotal deflector plate 80 is mounted within housing 72 with the pivot axis of plate 80 being transverse to and beneath the longitudinal axis of extractor 50 so that deflector plate 80 is beneath the longitudinal axis of extractor 50 when plate 80 is pivoted to its forward position. Deflector plate 80 includes a rear face 82. Plate 80 is pivotal between an initial position in which plate 80 is rearwardly inclined with inner contact face 82 being in the pathway of post setter 56 and a discharge position in which the plate 80 is pivoted forward to beneath the pathway of post setter 56. A support foot 84 is attached to the forward end of deflector 70 for placement against the ground when a marker is to be set.

Figure 13:
FIG. 13 is a side view of a preferred marker.
Figure 14:
FIG. 14 is a side view of the preferred marker after extraction and tip bending.

As illustrated in FIGS. 12-14, marker 34 is a planar sheet having an enlarged upper flag section 90 and a lower post section 92 which is partially inserted into the ground, leaving flag section 90 visible. The distal end of post section 92 preferably includes forked tips 94 to assist in anchoring marker 34 into the ground. Section 90 is preferably at least twice as wide as post 92. Post section 92 is longer than post setter 56 so that the tip of post section 92 extends beyond and is bendable around the tip of post setter 56. Markers 34 can be formed in a variety of ways, but preferable is cut from a sheet of flexible material, e.g., stiff plastic or paper.

In operation, a stack of planar markers 34 is inserted into the marker magazine 30. The operator places foot 84 of marker setter 10 against the ground where the marker is to be set and pushes downward on the handle section 12, pushing marker extractor 50 downward. The lead marker 34 is carried along with extractor 50 by the force of shoulder 60 against the top end of the marker. Post section 92 of marker 34 lays against post setter 56, with the distal end of marker 34 extending slightly, e.g., from about 0.25 to about 1.0 inch, beyond the distal end of post setter 56.

When moved downward, the distal end of the marker 34 initially contacts slanted inner contact face 82 of deflector plate 80 as illustrated in FIG. 8, bending the end of marker 34 into the pathway of post inserter 56.

Further downward movement brings the distal end of the post inserter 56 into contact with the bent part of the marker 34 as illustrated in FIG. 9, clamping the distal end of marker 34 between the distal end of the post inserter 56 and the face of deflector plate 80. Further downward movement causes deflector plate 80 to pivot to its forward position under the force of the post inserter 56, with the bent end of the marker 34, which is continually held between post inserter 56 and deflector plate 80 while the end of marker 34 is further bent around the end of the post inserter 56 as shown in FIG. 10.

Further downward movement of handle section 14 pushes the distal ends of post inserter 56 and marker 34 with the bent end into the ground as illustrated in FIG. 11. Handle section 12 is then returned to its raised position withdrawing post inserter 56 from the ground and into extractor housing 20. However, due to the anchoring by its bent end, marker 34 remains embedded in the ground.

Certain modifications and improvements will occur to those skilled in the art upon a reading of the foregoing description. It should be understood that such modifications and improvements have been deleted herein for the sake of conciseness and readability but are properly within the scope of the following claims.

What is claimed is:

1. A marker setter for inserting a utility marker into the ground comprising:
   a) a magazine holding a plurality of stacked planar markers, each of said markers having a flag section and a post section with a distal tip;
   b) a marker extractor adapted to extract a marker from said stacked plurality of markers and convey said marker along a pathway to insert the tip of said marker into the ground, said marker extractor having a post inserter with a distal end; and
   c) a tip deflector adapted to bend said marker distal tip around said post setter distal end prior to insertion of said tip into the ground.

2. The marker setter of claim 1, wherein said tip deflector includes a pivotal plate rotatable from a rear position in said pathway and a forward position beneath said pathway.

3. The marker setter of claim 1, wherein said marker tip extends beyond said post inserter distal end.

4. The marker setter of claim 1, wherein said marker extractor includes an extractor plate to receive the flag sections of said markers, said extractor plate including a shoulder to extract a marker from said stack.

5. The marker setter of claim 1, wherein said magazine includes a marker compressor to press said markers against said extractor.

6. The marker setter of claim 1, further including a telescoping handle having a lower section having a distal end and an upper section having a distal end, said upper section being telescoping in said lower section between a raised position and a lowered position, said extractor extending downward from said upper section and movable into contact with said tip deflector upon movement of said handle to its lowered position.

7. A marker setter for inserting a utility marker into the ground comprising:
 a) a telescoping handle having a lower section having a distal end and an upper section having a distal end, said upper section being telescoping in said lower section between a raised position and a lowered position;
 b) a magazine holding a plurality of stacked planar markers, each of said markers having a flag section and a post section with a distal tip;
 c) a marker extractor extending downwardly from said upper section, said extractor being adapted to extract a marker from said stacked plurality of markers and convey said marker along a pathway to insert the tip of said marker into the around upon movement of said handle upper section to the lowered position, said marker extractor having a post inserter with a distal end;
 d) a tip deflector adapted to bend said marker distal tip around said post setter distal end prior to insertion of said tip into the ground.

8. The marker setter of claim 7, wherein said tip deflector includes a pivotal plate rotatable from a rear position in said pathway and a forward position beneath said pathway.

9. The marker setter of claim 7, wherein said marker tip extends beyond said post inserter distal end.

10. The marker setter of claim 7, wherein said marker extractor includes an extractor plate to receive the flag sections of said markers, said extractor plate including a recess having the thickness of a single marker to extract a single marker from said stack.

11. The marker setter of claim 7, wherein said magazine includes a marker compressor to press said markers against said extractor.

12. The marker setter of claim 7, wherein said extractor includes a drive rod having an upper end attached to said handle upper section and a distal end, an extractor plate having an upper end attached to said drive rod distal end and a distal end, and a post setter having an upper end attached to the distal end of said plate, said rod, plate and post setter being axially aligned.

13. The marker setter of claim 12, wherein said drive rod includes a non-conductive section to insulate said handle from said post setter.

14. A marker setter for inserting a utility marker into the ground comprising:
 a) a telescoping handle having a lower section having a distal end and an upper section having a distal end, said upper section being telescoping in said lower section between a raised position and a lowered position;
 b) an extractor housing attached to the distal end of said lower handle section, said housing including a marker receiving opening and a discharge slot;
 c) a marker extractor including a drive rod having an upper end attached to said handle upper section and a distal end, an extractor plate having an upper end attached to said drive rod distal end and a distal end, and a post setter having an upper end attached to the distal end of said plate, said rod, plate and post setter being axially aligned;
 d) a magazine including a marker chamber holding a plurality of stacked planar markers, each of said markers having a flag section and a post section with a distal tip, said marker chamber being in communication with said extractor housing through said marker receiving opening to position markers against said extractor plate;
 e) a tip deflector adapted to bend said marker distal tip around said post setter distal end prior to insertion of said tip into the ground, said deflector including a pivotal deflector plate positioned in the pathway of markers and said post setter.

15. The marker setter of claim 14, wherein said deflector plate is pivotal from a rearwardly inclined position in said pathway and a forward position beneath said pathway.

16. The marker setter of claim 14, wherein said marker tip extends beyond said post inserter distal end.

17. The marker setter of claim 14, wherein said extractor plate including a recess having the thickness of a single marker to extract a single marker from said stack.

18. The marker setter of claim 14, wherein said magazine includes a marker compressor to press said markers against said extractor.

19. The marker setter of claim 14, wherein said drive rod includes a non-conductive section to insulate said handle from said post setter.

20. The marker setter of claim 14, wherein said deflector plate has a pivot axis transverse to and beneath the longitudinal axis of the extractor.

* * * * *